United States Patent
Yamamoto

[11] Patent Number: 6,068,098
[45] Date of Patent: May 30, 2000

[54] DYNAMIC DAMPER AND COUPLING MECHANISM

[75] Inventor: Kozo Yamamoto, Daito, Japan

[73] Assignee: Exedy Corporation, Osaka, Japan

[21] Appl. No.: 09/110,662

[22] Filed: Jul. 7, 1998

[30] Foreign Application Priority Data

Jul. 11, 1997 [JP] Japan .................................. 9-186754

[51] Int. Cl.[7] .................................................. F16F 15/30
[52] U.S. Cl. ........................... 192/30 V; 192/209; 74/574
[58] Field of Search .................. 192/30 V, 48.8, 192/209; 74/574

[56] References Cited

U.S. PATENT DOCUMENTS

| | | | |
|---|---|---|---|
| 1,723,886 | 8/1929 | Pfaff | 192/70.17 |
| 1,828,508 | 10/1931 | Murray | 192/53.36 |
| 2,958,526 | 11/1960 | Ulderup et al. | 267/63 |
| 3,209,875 | 10/1965 | Altmann | 192/66 |
| 4,157,227 | 6/1979 | Hahle | 403/228 |
| 4,796,740 | 1/1989 | Fukushima | 192/30 V |
| 4,828,090 | 5/1989 | Matsushita | 192/84 |
| 4,842,116 | 6/1989 | Fukushima | 192/106.2 |
| 4,844,224 | 7/1989 | Fukushima | 192/70.17 |
| 4,846,323 | 7/1989 | Fukushima | 192/30 |
| 5,135,089 | 8/1992 | Kovac | 192/70.17 |
| 5,152,510 | 10/1992 | Komabashiri | 267/141.2 |
| 5,168,971 | 12/1992 | Kovac | 192/30 |
| 5,190,269 | 3/1993 | Ikeda et al. | 267/140.12 |
| 5,253,740 | 10/1993 | Kohno et al. | 192/70.16 |
| 5,452,781 | 9/1995 | Eckel | 192/30 V |
| 5,499,703 | 3/1996 | Kii et al. | 192/70.11 |
| 5,511,446 | 4/1996 | Kajitani et al. | 74/573 F |
| 5,669,820 | 9/1997 | Fukushima | 464/98 |
| 5,692,591 | 12/1997 | Kimura | 192/84.941 |
| 5,797,297 | 8/1998 | Mokdad | 74/574 |
| 5,967,278 | 10/1999 | Fukushima et al. | 192/30 V X |

FOREIGN PATENT DOCUMENTS 658031 6/1994 Japan .
2153929 8/1985 United Kingdom .

Primary Examiner—Rodney H. Bonck
Attorney, Agent, or Firm—Shinjyu Global IP Counselors, LLP

[57] ABSTRACT

The dynamic damper allows for a stable operation of a sub-clutch without complicating a structure of the sub-clutch. A dynamic damper 170 attached to a coupling mechanism 191 for coupling a crankshaft 90 of an engine and an input shaft 9 of a transmission includes a mass member 171, a sub-clutch 173 and an annular rubber member 172. The sub-clutch 173 has a release member 186 which can be directly coupled to an inner peripheral portion of a diaphragm spring 4b and is axially movable, and releases the interlocked relationship between the input shaft 9 and the mass member 171 when the crankshaft 90 and the input shaft 9 are released from each other. The annular rubber member 172 elastically couples the input shaft 9 and the mass member 171 together in a rotating direction when the sub-clutch 173 keeps the interlock relationship between the input shaft 9 and the mass member 171.

20 Claims, 2 Drawing Sheets

DYNAMIC DAMPER AND COUPLING MECHANISM

BACKGROUND OF THE INVENTION

1. Field of the Invention

This invention generally relates a dynamic damper and a coupling mechanism. More specifically, the present invention relates to a dynamic damper which rotates with an input shaft of a transmission for dampening vibrations.

2. Background Information

In connection with such a dynamic damper and a coupling mechanism, the assignee has already developed related inventions disclosed in Japanese Laid-Open Patent Publication No. 6-48031 (1994) as well as other similar dynamic dampers and coupling mechanisms.

In the above-mentioned prior arts, a second flywheel forming a mass portion is coupled to a drive and transmission system through a torsional damper mechanism to dampen a torsional vibration on the drive and transmission system only when a clutch disk is pressed against a first flywheel. Thereby, an operation impeding shifting of the transmission is suppressed in a disengaged state of a clutch while suppressing gear noises (neutral noises) of the transmission in a neutral state as well as vibrations and noises of the transmission during driving of a vehicle.

In the above prior art, a frictional dampening mechanism (sub-clutch) is employed for coupling the second flywheel to the drive and transmission system. The sub-clutch is operated to engage by utilizing an axial movement of the clutch disk, which occurs when the clutch disk is pressed against the first flywheel. More specifically, a motion of a spline hub, which occurs in accordance with the movement of the clutch disk is utilized to engage frictionally the sub-clutch.

However, the distance of axial movement of the clutch disk is very short. Further, due to deflection of a plate and others which couple the clutch disk to the spline hub, the distance of axial movement of the spline hub is shorter than the distance of axial movement of the clutch disk. Therefore, a member for engaging and disengaging the sub-clutch moves only a small distance. Accordingly, the sub-clutch may operate unstably. For avoiding this unstable operation, the sub-clutch may be adapted to require only a small movement for stable operation. However, this may complicate the structure of the sub-clutch.

In view of the above, there exists a need for a dynamic damper and a coupling mechanism which overcomes the above-mentioned problems in the prior art. This invention addresses these needs in the prior art as well as other needs, which will become apparent to those skilled in the art from this disclosure.

SUMMARY OF THE INVENTION

An object of the invention is to provide a dynamic damper, which allows a more stable operation of the sub-clutch without complicating the structure of the sub-clutch.

According to a first aspect of the present invention, a dynamic damper attached to a coupling mechanism includes a mass portion, a sub-clutch and an elastic portion.

The coupling mechanism is a mechanism including a flywheel assembly, a clutch disk assembly and a clutch cover assembly. The coupling mechanism is operable to engage and disengage a crankshaft of an engine with and from an input shaft of a transmission in accordance with an axial movement of a release bearing. The flywheel assembly is non-rotatably coupled to the crankshaft of the engine. The clutch disk assembly is non-rotatably coupled to the input shaft of the transmission. The clutch cover assembly has a diaphragm spring, and frictionally engages the flywheel assembly and the clutch disk assembly by a biasing force of the diaphragm spring. The release bearing is fixed to an inner peripheral portion of the diaphragm spring. By the axial movement of the release bearing, the biasing force of the diaphragm spring is released, and the coupling between the crankshaft of the engine and the input shaft of the transmission is released.

The mass portion can rotate in accordance with rotation of the input shaft of the transmission. The sub-clutch has a release member for releasing an interlocked relationship between the input shaft of the transmission and the mass portion when the coupling between the crankshaft of the engine and the input shaft of the transmission is also released. The release member can be directly coupled to the release bearing or the inner peripheral portion of the pressure plate, and can move axially. The elastic portion elastically couples the input shaft of the transmission and the mass portion together in a rotating direction when the sub-clutch operates the input shaft of the transmission and the mass portion in an interlocked manner.

According to this aspect of the present invention, the coupling mechanism provided with the above dynamic damper mechanism for supplying a torque from the crankshaft of the engine through the flywheel assembly, the clutch cover assembly, the clutch disk assembly to the input shaft of the transmission. When the clutch disk assembly is frictionally engaged with the flywheel assembly, i.e., when the coupling mechanism is in the coupled state, the sub-clutch acts to operate the dynamic damper in accordance with the rotation of the input shaft of the transmission. Therefore, the dynamic damper dampens neutral noises in the neutral state of the transmission as well as noises thereof during driving. The above structure does not employ an inertia damper which avoids a resonance by mere addition of an inertia, but employs the dynamic damper. Therefore, it is possible to dampen the vibration of the input shaft of the transmission in a partial rotation range. Consequently, the vibration can be reduced to a level, which cannot be attained by the internal damper.

For releasing the interlocked operation of the dynamic damper, the structure of the present invention is provided with the release member being directly coupled to the release bearing or the inner peripheral portion of the pressure plate for axial movement. The distance of movement of the release bearing and the inner peripheral portion of the pressure plate is larger than the distance in which the prior art clutch disk assembly moves a release member to release the sub-clutch in the prior art. Therefore, engagement and disengagement of the sub-clutch of the present invention can be performed more stably than the prior art.

According to the dynamic damper of this aspect of the present invention, the member for operating the sub-clutch can axially move a longer distance than the prior art. Therefore, it is not necessary to complicate the structure compared with the prior art, and the operation of the sub-clutch can be stable.

According to a second aspect of the present invention, the dynamic damper according to the first aspect further has such a feature that the release member is disposed between the input shaft of the transmission and the clutch disk assembly. The release member has an inner peripheral portion non-rotatably engaged with the outer peripheral portion of the input shaft of the transmission and an outer peripheral portion non-rotatably engaged with the inner peripheral portion of the clutch disk assembly.

In this aspect, the clutch disk assembly and the input shaft of the transmission are coupled together in the rotating direction via the release member. The release member can transmit the motion of the release bearing disposed, for example, on the transmission side of the clutch disk assembly to the sub-clutch disposed on the engine side of the clutch disk assembly. Therefore, arrangement of the dynamic damper with respect the position of the release bearing can be determined more freely, and the space within the coupling mechanism can be used effectively for arranging the dynamic damper.

According to a third aspect of the present invention, a coupling mechanism for coupling a crankshaft of an engine and an input shaft of a transmission includes a flywheel assembly, a clutch disk assembly, a clutch cover assembly and a dynamic damper. The flywheel assembly is non-rotatably coupled to the crankshaft of the engine. The clutch disk assembly is coupled to the input shaft of the transmission. The clutch cover assembly has a diaphragm spring, and frictionally engages the flywheel assembly and the clutch disk assembly. The dynamic damper of the flywheel assembly is the same as that according to the first or second aspect of the present invention.

The foregoing and other objects, aspects advantages and salient features of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

Figure 1:
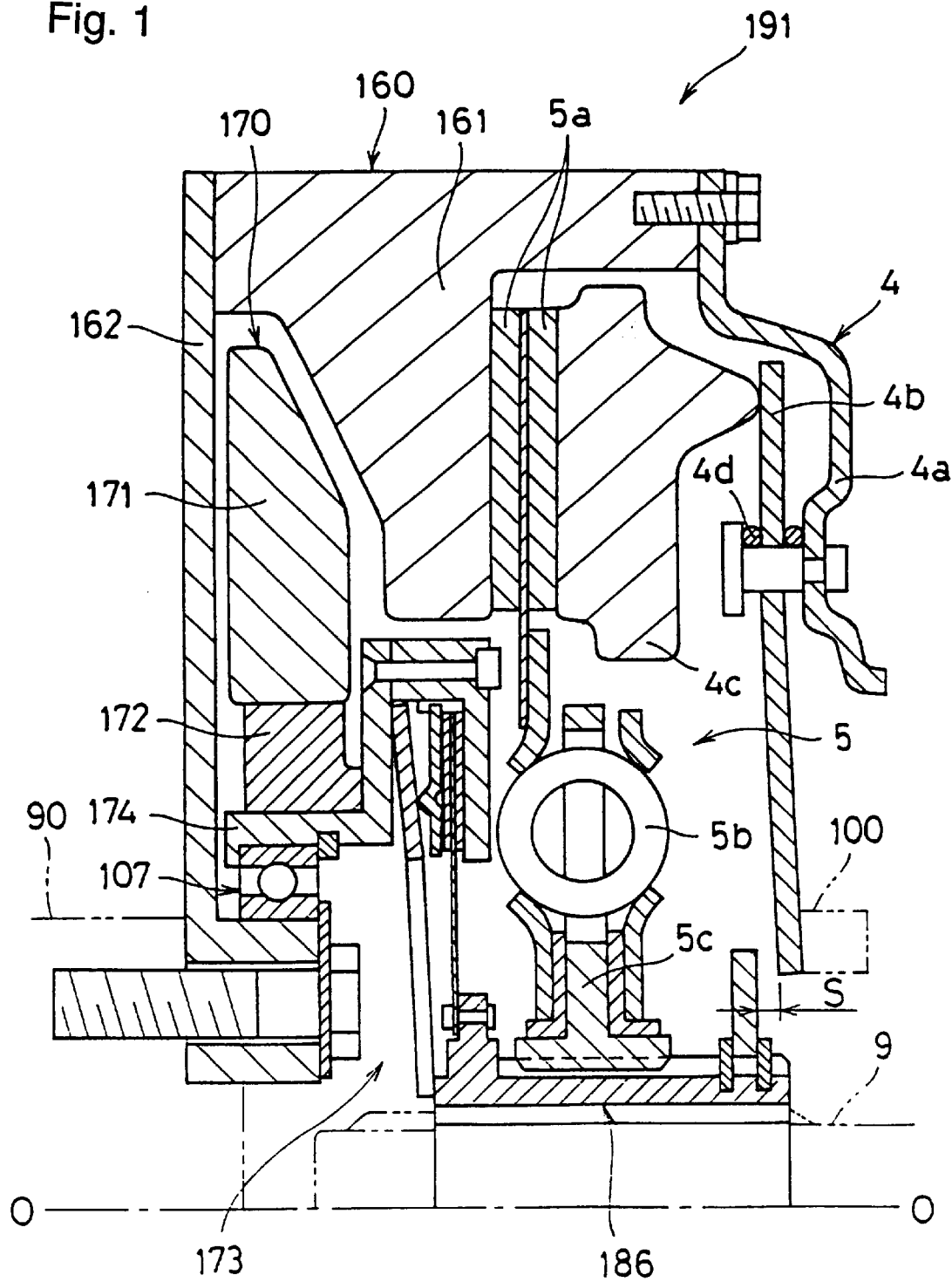
FIG. 1 is a partial cross-sectional view of a coupling mechanism in accordance with one embodiment of the present invention.

Referring initially to FIG. 1, a partial cross-sectional view of a coupling mechanism 191 is illustrated which includes a dynamic damper 170 in accordance with one embodiment of the present invention. The coupling mechanism 191 is provided for engaging and disengaging a crankshaft 90 of an engine with and from an input shaft 9 of a transmission, and includes a dynamic damper 170 which is connected by a sub-clutch 173 to the input shaft 9 of the transmission for dampening a vibration of the transmission.

The coupling mechanism 191 is basically formed of a flywheel assembly 160, a clutch cover assembly 4, a clutch disk assembly 5 and the dynamic damper 170. A rotation axis of the coupling mechanism 190 is represented by line O—O in FIG. 1.

The flywheel assembly 160 is non-rotatably coupled to the crankshaft 90 of the engine. The flywheel assembly 160 is basically formed of a flywheel 161 and an annular or circular plate member 162. The flywheel 161 and the annular plate member 162 have their outer peripheral portions fixedly connected together. The inner peripheral portion of the annular plate member 162 is fixedly coupled to the crankshaft 90 of the engine by a plurality of circumferentially equally spaced apart bolts (only one shown).

The clutch cover assembly 4 is basically formed of a clutch cover 4a, an annular diaphragm spring 4b and a pressure plate 4c which is biased toward the engine (leftward as viewed in FIG. 1) by the diaphragm spring 4b. The clutch cover assembly 4 can bias the pressure plate 4c toward the flywheel 161 to hold the outer peripheral portion (frictional engagement portion) of the clutch disk assembly 5 between the flywheel 161 and the pressure plate 4c for frictional engagement between the flywheel assembly 4 and the clutch disk assembly 5. The clutch cover 4a is fixed at its outer peripheral portion to an end of the flywheel 161 near the engine (i.e., a right end as viewed in FIG. 1). The inner peripheral portion of the clutch cover 4a carries a radially middle portion (more specifically, a relatively outer portion) of the diaphragm spring 4b via wire rings 4d.

The pressure plate 4c is held within the clutch cover 4a by the outer peripheral portion of the diaphragm spring 4b and others parts in a conventional manner. The pressure plate 4c moves axially when a release bearing 100 fixed to the inner periphery of the diaphragm spring 4b is moved along the rotation axis O—O (i.e., an axial direction) to apply a biasing force from the diaphragm spring 4b to the pressure plate 4c or releasing the biasing force thereof In this structure, the distance of axial movement of the release bearing 100 and the inner periphery of the diaphragm spring 4b is shorter than the distance of movement of the pressure plate 4c and the diaphragm spring 4b (see FIG. 1).

A clutch disk assembly 5 is basically formed of a frictional engagement portion having friction facings 5a, a splined hub 5c and coil springs 5b. The coil springs 5b elastically couple the frictional engagement portion and the splined hub 5c together in the rotating direction. The inner periphery of the splined hub 5c has splines which engage the outer spline teeth 186c of a release member 186, which in turn has interval splines that engage the splines of the input shaft 9 of the transmission as will be described later.

The dynamic damper 170 is basically formed of an annular mass member (mass portion) 171, an annular rubber member (elastic portion) 172, a support member 174 and a sub-clutch 173. The mass member 171 is disposed between the flywheel 161 and the annular plate member 162. The annular rubber member 172 elastically couples the mass member 171 to the support member 174 in the circumferential, axial and radial directions.

Figure 2:
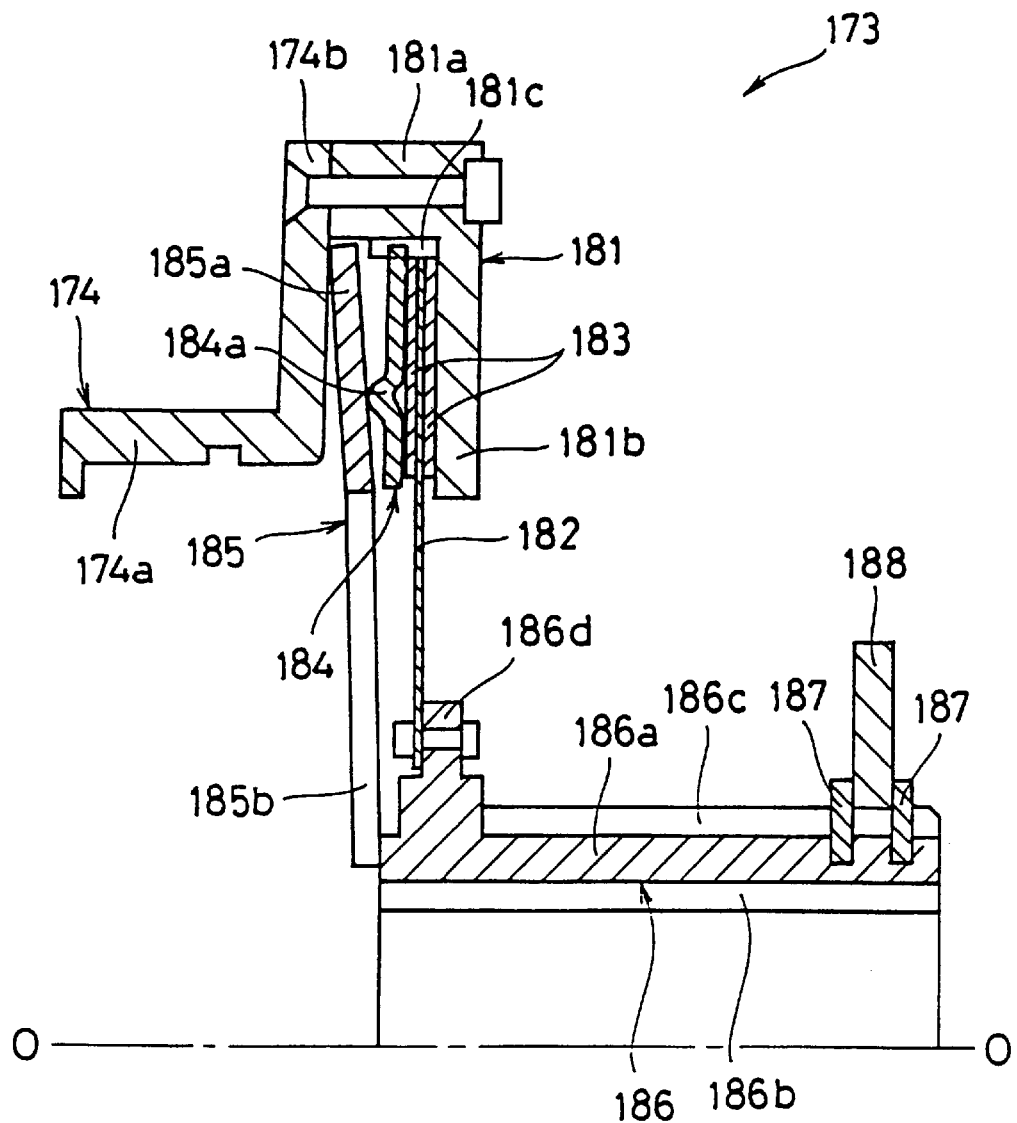
FIG. 2 is a partial cross-sectional view of the sub-clutch of the coupling mechanism illustrated in FIG. 1.

As shown in FIG. 2, the support member 174 is formed of a cylindrical portion 174a and an annular or circular plate portion 174b extending radially outward from the end of the cylindrical portion 174a nearest to the transmission. The inner peripheral surface of the cylindrical portion 174a is fixed to an outer race of a ball bearing 107. The inner race of the ball bearing 107 is fixed to the inner peripheral portion of the annular plate member 162 of the flywheel assembly 160. Therefore, the support member 174 is rotatably carried by the flywheel assembly 160 but is unmovably coupled to the flywheel assembly 160 in the radial and axial directions by the ball bearing 107. The outer peripheral surface of the cylindrical portion 174a and a portion of the surface of the annular plate portion 174b opposed to the engine are fixedly coupled to the inner peripheral portion of the annular rubber member 172 in a conventional manner.

Still referring to FIG. 2, the sub-clutch 173 is a mechanism for engaging and disengaging the above three components (i.e., mass member 171, annular rubber member 172 and support member 174) with and from the input shaft 9 of the transmission. The sub-clutch 173 is of a frictional engagement type clutch. As shown in FIGS. 1 and 2, the sub-clutch 173 is basically formed of the foregoing support member 174 as well as a sub-clutch housing 181 (a first part), a friction plate 182 (a second part), an indirect member 184, a small diaphragm spring 185, a cylindrical release member 186, retainer members 187 and a transmission member 188.

The sub-clutch housing 181 is formed of a cylindrical portion 181a and a frictional engagement portion 18 1b which extends radially inward from the end of the cylindrical portion 181a near the transmission (i.e., right end as viewed in FIG. 2). The surface of the cylindrical portion 181 a facing the engine (i.e., left side as viewed in FIG. 2) is in contact with the outer peripheral portion of the annular plate member 174b of the support member 174. Preferably, the cylindrical portion 181a of the sub-clutch housing 181 is fixedly coupled to the annular plate member 174b by rivets. The cylindrical portion 181 a is provided at its inner peripheral surface with engagement portions 181c which project radially inwardly to engage the indirect member 184 as discussed below.

The friction plate 182 includes a thin annular plate with friction members 183 which fixedly couple the axially opposite facing surfaces of its outer peripheral portion. The friction plate 182 is fixed at its inner peripheral portion to the release member 186. The outer peripheral portion of the friction plate 182 is located on the engine side with respect to the frictional engagement portion 181b of the sub-clutch housing 181. More specifically, the friction plate 182 is located between the frictional engagement portion 181b of the sub-clutch housing 181 and the support member 174. The friction plate 182 is normally biased against the frictional engagement portion 181b by the diaphragm spring 185, which presses the indirect member 184 against the friction plate 182.

The indirect member 184 is an annular plate which is provided at its radially middle portion with an annular projection 184a projecting toward the engine. The indirect member 184 has its outer peripheral portion partially engaged with the engagement portion 181c of the sub-clutch housing 181. Therefore, indirect member 184 is axially movable with respect to the sub-clutch housing 181, but is circumferentially non-rotatable with respect to the sub-clutch housing 181. This arrangement suppressing rattling within the sub-clutch housing 181. This indirect member 184 is disposed on the engine side with respect to the outer peripheral portion of the friction plate 182.

The small diaphragm spring 185 is formed of a radially outer biasing portion 185a having an annular and conical form and a plurality of release levers 185b extending radially inward from the radially outer biasing portion 185a. The radially outer biasing portion 185a is disposed on the engine side with respect to the indirect member 184. The annular plate portion 174b of the support member 174 prohibits the movement of the outer periphery of the radially outer biasing portion 185a toward the engine. Thus, the radially outer biasing portion 185a pushes the outer peripheral portion of the friction plate 182 against the frictional engagement portion 181b of the sub-clutch housing 181 through the projection 184a of the indirect member 184. The inner peripheral portion of the release levers 185b are in contact with the end surface of a cylindrical main portion 186a of the release member 186 which is opposed to the engine.

The release member 186 is formed of the cylindrical main portion 186a having inner spline teeth 186b formed at the inner peripheral surface of the cylindrical main portion 186a, outer spline teeth 186c formed at the outer peripheral surface of the cylindrical main portion 186a and a fixing portion 186d extending radially outward from a portion of the cylindrical main portion 186a near the engine. The cylindrical main portion 186a is disposed radially between the splined hub 5c and the input shaft 9 of the transmission. The inner spline teeth 186b of the cylindrical main portion 186a are non-rotatably engaged with the outer spline teeth of the input shaft 9 of the transmission. The splined hub 5c is non-rotatably supported on the cylindrical main portion 186b by the outer spline teeth 186b engaging the spline teeth of the splined hub 5c. Thus, the release member 186 is axially movable and circumferentially non-rotatable with respect to the input shaft 9 of the transmission and the splined hub 5c. The inner peripheral portion of the friction plate 182 is fixed to the outer peripheral portion of the fixing portion 186d by a plurality of rivets or the like. A portion of the cylindrical main portion 186a near the transmission carries the annular transmission member 188 fixed thereto by the retainer members 187.

The transmission member 188 comes into contact with the inner peripheral portion of the diaphragm spring 4b to transmit the moving force of the release bearing 100 toward the engine to the release member 186 when the release bearing 100 and the inner peripheral portion of the diaphragm spring 4b move toward the engine. A space having an axial length of S is normally kept between the transmission member 188 and the inner peripheral portion of the diaphragm spring 4b such that the diaphragm spring 185 normally holds the friction plate 182 against the frictional engagement portion 181b of the sub-clutch housing 181.

The operation of the coupling mechanism 191 and its the dynamic damper 170 will now be described below. Rotation of the crankshaft 90 of the engine is transmitted to the input shaft 9 of the transmission through the flywheel assembly 160, clutch cover assembly 4 and clutch disk assembly 5 in a relatively conventional manner.

When the coupling mechanism 191 is in the engaged state shown in FIG. 1, the diaphragm spring 4b biases the pressure plate 4c toward the flywheel 161, and the frictional engagement portion of the clutch disk assembly 5 is held between the flywheel 161 and the pressure plate 4c. Thereby, the crankshaft 90 of the engine is coupled to the input shaft 9 of the transmission. In this engaged state, as best shown in FIG. 2, the small diaphragm spring 185 also biases the outer peripheral portion of the friction plate 182 toward the transmission, such that the sub-clutch housing 181 and the friction plate 182 are frictionally engaged. Therefore, the input shaft 9 of the transmission is operatively coupled to the mass portion 171, annular rubber member 172 and support member 174 of the dynamic damper 170 through the release member 186, friction plate 182 and sub-clutch housing 181.

When the dynamic damper 170 is operatively coupled to the input shaft 9 of the transmission, the dynamic damper 170 damps neutral noises of the transmission and noises during driving. In particular, the dynamic damper 170 actively damps the vibration of the transmission in a partial rotation range.

When the coupling mechanism 191 is to be released, the release bearing 100 is moved toward the engine from the position shown in FIG. 1 in a conventional manner. When the release bearing 100 starts to move toward the engine, the outer peripheral portion of the diaphragm spring 4b moves toward the transmission so that the pressure plate 4c is released and moves toward the transmission. Thereby, the frictional engagement portion of the clutch disk assembly 5 is first released from the flywheel 161 and the pressure plate 4c, and the crankshaft 90 of the engine is decoupled from the input shaft 9 of the transmission.

As the release bearing 100 moves toward the engine, the spaces disappears so that the release bearing 100 pushes against the transmission member 188 to move the release member 186 toward the engine. This pushing force moves the release member 186 toward the engine such that the inner peripheral portion of the small diaphragm spring 185 and the friction plate 182 also move toward the engine. This movement decreases the biasing force applied by the small diaphragm spring 185 against the friction plate 182. Thus, the frictional engagement between the friction plate 182 and the sub-clutch housing 181 is released. Thereby, the mass member 171 and the annular rubber member 172 of the dynamic damper 170 no longer rotates together with the input shaft 9 of the transmission so that the inertia of the input shaft 9 of the transmission decreases. In the disengaged state of the coupling mechanism 191, a shifting operation of the transmission can be performed smoothly.

The above structure directly utilizes the motion of the release bearing for releasing the interlocked relationship of the dynamic damper 170 with respect to the input shaft 9 of the transmission. Therefore, the operation of the sub-clutch 173 can be stabilized without complicating the structure of the sub-clutch 173, compared with a conventional structure in which the sub-clutch is operated by utilizing the motion of the spline hub or the like.

For releasing the interlocked operation of the dynamic damper, the structure of the present invention is provided with the release member being directly coupled to the release bearing or the inner peripheral portion of the pressure plate for axial movement. The distance of movement of the release bearing and the inner peripheral portion of the pressure plate is larger than the distance in which the prior art clutch disk assembly moves a release member to release the sub-clutch in the prior art. Therefore, engagement and disengagement of the sub-clutch of the present invention can be performed more stably than the prior art.

While only one embodiment has been chosen to illustrate the present invention, it will be apparent to those skilled in the art from this disclosure that various changes and modifications can be made herein without departing from the scope of the invention as defined in the appended claims.

What is claimed is:

1. A dynamic damper assembly adapted to be attached to a coupling mechanism including a flywheel assembly non-rotatably coupled to a crankshaft of an engine, a clutch disk assembly coupled to an input shaft of a transmission, a clutch cover assembly having a diaphragm spring and a pressure plate frictionally engaging the flywheel assembly and the clutch disk assembly by a biasing force of the diaphragm spring, the coupling mechanism being operable to engage and disengage the crankshaft of the engine with and from the input shaft of the transmission together by a release bearing engaged with an inner peripheral portion of the diaphragm spring, the release bearing being operable to move axially to release a biasing force of the diaphragm spring, and the dynamic damper assembly comprising:

a mass portion adapted to rotate with the input shaft of the transmission;

a sub-clutch having a first part coupled to said mass portion and a second part configured to be coupled to the input shaft of the transmission, said second part of said sub-clutch having a release member with a transmitting member adapted to be movably coupled to the input shaft of the transmission, said transmitting member of said release member being positioned to be axially moved by the inner peripheral portion of the diaphragm spring in response to axial movement of the release bearing, said sub-clutch releasing an interlocked relationship between the input shaft of the transmission and said mass portion when the crankshaft of the engine and the input shaft of the transmission are disengaged; and an elastic portion adapted to elastically couple the input shaft of the transmission and said mass portion together in a rotating direction when said sub-clutch interlocks the input shaft of the transmission to said mass portion to rotate therewith.

2. The dynamic damper assembly according to claim 1, wherein said release member is adapted to be disposed between the input shaft of the transmission and the clutch disk assembly, and has an inner peripheral portion adapted to be non-rotatably engaged with an outer peripheral portion of the input shaft of the transmission and an outer peripheral portion adapted to be non-rotatably engaged with an inner peripheral portion of the clutch disk assembly.

3. The dynamic damper assembly according to claim 1, wherein said release member has a splined bore that is adapted to be movably mounted on the input shaft of the transmission in an axial direction.

4. The dynamic damper assembly according to claim 1, wherein said sub-clutch further includes a friction plate mounted to said release member and extending radially outwardly therefrom.

5. A dynamic damper assembly according to claim 4, wherein said sub-clutch further includes a sub-clutch housing coupled to said mass portion via said elastic portion.

6. A dynamic damper assembly according to claim 5, wherein said sub-clutch further includes a diaphragm spring extending between said sub-clutch housing and said release member.

7. A dynamic damper assembly according to claim 6, wherein said diaphragm spring of said sub-clutch being arranged to normally press said friction plate against said sub-clutch housing to releasably couple said mass portion to said release portion.

8. The dynamic damper assembly according to claim 1, wherein said sub-clutch further includes a sub-clutch housing coupled to said mass portion via said elastic portion.

9. A dynamic damper assembly adapted to be attached to a coupling mechanism including a flywheel assembly non-rotatably coupled to a crankshaft of an engine, a clutch disk assembly coupled to an input shaft of a transmission, a clutch cover assembly having a diaphragm spring and a pressure plate frictionally engaging the flywheel assembly and the clutch disk assembly by a biasing force of the diaphragm spring, the coupling mechanism being operable to engage and disengage the crankshaft of the engine with and from the input shaft of the transmission together by a release bearing engaged with an inner peripheral portion of the diaphragm spring, the release bearing being operable to move axially to release a biasing force of the diaphragm spring, and the dynamic damper assembly comprising:

a mass portion adapted to rotate with the input shaft of the transmission;

a sub-clutch coupled to said mass portion and configured to be coupled to the input shaft of the transmission, said sub-clutch having a release member adapted to be coupled to the input shaft of the transmission to axially move in response to axial movement of the release bearing, said sub-clutch releasing an interlocked relationship between the input shaft of the transmission and said mass portion when the crankshaft of the engine and the input shaft of the transmission are disengaged; and an elastic portion adapted to elastically couple the input shaft of the transmission and said mass portion together in a rotating direction when said sub-clutch interlocks the input shaft of the transmission to said mass portion to rotate therewith, said release member having a splined outer peripheral portion that is adapted to movably receive the clutch disk assembly.

10. A coupling mechanism for coupling a crankshaft of an engine and an input shaft of a transmission comprising:

a flywheel assembly adapted to be non-rotatably coupled to the crankshaft of the engine;

a clutch disk assembly adapted to be coupled to the input shaft of the transmission;

a clutch cover assembly having a diaphragm spring and a pressure plate being operable to engage frictionally said flywheel assembly and said clutch disk assembly; and a dynamic damper assembly adapted to be coupled to the input shaft of the transmission, said dynamic damper assembly including a mass portion adapted to rotate with the input shaft of the transmission; a sub-clutch having a first part coupled to said mass portion and a second part configured to be coupled to the input shaft of the transmission, said second part of said sub-clutch having a release member with a transmitting member adapted to be movably coupled to the input shaft of the transmission, said transmitting member of said release member being positioned to be axially moved by an inner peripheral portion of said diaphragm spring upon movement of said diaphragm spring to a clutch disengaged position in response to axial movement of the release bearing, said sub-clutch releasing an interlocked relationship between the input shaft of the transmission and said mass portion when the crankshaft of the engine and the input shaft of the transmission are disengaged; and an elastic portion adapted to elastically couple the input shaft of the transmission and said mass portion together in a rotating direction when said sub-clutch interlocks the input shaft of the transmission to said mass portion to rotate therewith.

11. The coupling mechanism according to claim 10, wherein said release member is adapted to be disposed between the input shaft of the transmission and said clutch disk assembly, and has an inner peripheral portion adapted to be non-rotatably engaged with an outer peripheral portion of the input shaft of the transmission and an outer peripheral portion non-rotatably engaged with an inner peripheral portion of said clutch disk assembly.

12. The coupling mechanism assembly according to claim 10, wherein said release member has a splined bore that is adapted to be movably mounted on the input shaft of the transmission in an axial direction.

13. The coupling mechanism according to claim 10, wherein said sub-clutch further includes a friction plate mounted to said release member and extending radially outwardly therefrom.

14. The coupling mechanism according to claim 13, wherein said sub-clutch further includes a sub-clutch housing coupled to said mass portion via said elastic portion.

15. The coupling mechanism according to claim 14, wherein said sub-clutch further includes a diaphragm spring extending between said sub-clutch housing and said release member.

16. The coupling mechanism according to claim 15, wherein said diaphragm spring of said sub-clutch being arranged to normally press said friction plate against said sub-clutch housing to releasably couple said mass portion to said release portion.

17. The coupling mechanism according to claim 10, wherein said sub-clutch further includes a sub-clutch housing coupled to said mass portion via said elastic portion.

18. A coupling mechanism for coupling a crankshaft of an engine and an input shaft of a transmission comprising:

a flywheel assembly adapted to be non-rotatably coupled to the crankshaft of the engine;

a clutch disk assembly adapted to be coupled to the input shaft of the transmission;

a clutch cover assembly having a diaphragm spring and being operable to engage frictionally said flywheel assembly and said clutch disk assembly; and a dynamic damper assembly adapted to be coupled to the input shaft of the transmission, said dynamic damper assembly including a mass portion adapted to rotate with the input shaft of the transmission;

a sub-clutch coupled to said mass portion and configured to be coupled to the input shaft of the transmission said sub-clutch having a release member adapted to be coupled to the input shaft of the transmission to axially move in response to axial movement of an inner peripheral portion of said diaphragm spring, said sub-clutch releasing an interlocked relationship between the input shaft of the transmission and said mass portion when the crankshaft of the engine and the input shaft of the transmission are disengaged; and an elastic portion adapted to elastically couple the input shaft of the transmission and said mass portion together in a rotating direction when said sub-clutch interlocks the input shaft of the transmission to said mass portion to rotate therewith, said release member having a splined outer peripheral portion that is adapted to movably receive the clutch disk assembly.

19. A dynamic damper assembly adapted to be attached to a coupling mechanism including a flywheel assembly non-rotatably coupled to a crankshaft of an engine, a clutch disk assembly coupled to an input shaft of a transmission, and a clutch cover assembly having a diaphragm spring and a pressure plate frictionally engaging the flywheel assembly and the clutch disk assembly by a biasing force of the diaphragm spring, said dynamic damper assembly comprising:

a mass portion adapted to rotate with the input shaft of the transmission;

a sub-clutch having a first part coupled to said mass portion and a second part configured to be coupled to the input shaft of the transmission, said second part of said sub-clutch having a release member adapted to be coupled to the input shaft of the transmission to axially move in response to an axial movement of an inner peripheral portion of the diaphragm spring, said release member having an outer peripheral portion that is adapted to movably receive the clutch disk assembly, said sub-clutch releasing an interlocked relationship between the input shaft of the transmission and said mass portion when the crankshaft of the engine and the input shaft of the transmission are disengaged; and an elastic portion adapted to elastically couple the input shaft of the transmission and said mass portion together in a rotating direction when said sub-clutch interlocks the input shaft of the transmission to said mass portion to rotate therewith.

20. A coupling mechanism for coupling a crankshaft of an engine and an input shaft of a transmission comprising:

a flywheel assembly adapted to be non-rotatably coupled to the crankshaft of the engine;

a clutch disk assembly adapted to be coupled to the input shaft of the transmission;

a clutch cover assembly having a diaphragm spring and a pressure plate being operable to frictionally engage said flywheel assembly and said clutch disk assembly; and a dynamic damper assembly adapted to be coupled to the input shaft of the transmission, said dynamic damper assembly including a mass portion adapted to rotate with the input shaft of the transmission;

a sub-clutch having a first part coupled to said mass portion and a second part configured to be coupled to the input shaft of the transmission, said sub-clutch having a release member adapted to be coupled to the input shaft of the transmission to axially move in response to axial movement of an inner peripheral portion of said diaphragm spring, said clutch disk assembly being movably mounted on said release member to move in an axial direction, said sub-clutch releasing an interlocked relationship between the input shaft of the transmission and said mass portion when the crankshaft of the engine and the input shaft of the transmission are disengaged; and an elastic portion adapted to elastically couple the input shaft of the transmission and said mass portion together in a rotating direction when said sub-clutch interlocks the input shaft of the transmission to said mass portion to rotate therewith.

* * * * *